Aug. 19, 1941.                    W. M. SPRENG                       2,252,872
                                 TRACTION SPRAYER
                              Filed June 19, 1939            3 Sheets-Sheet 2
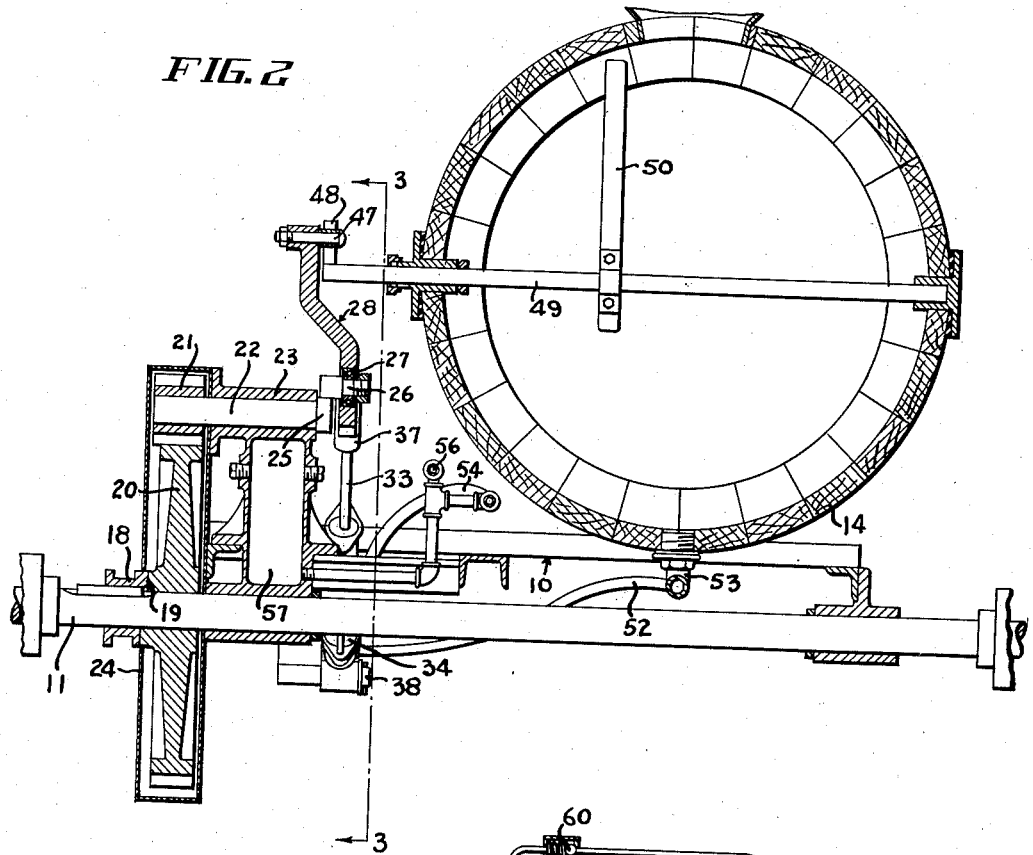
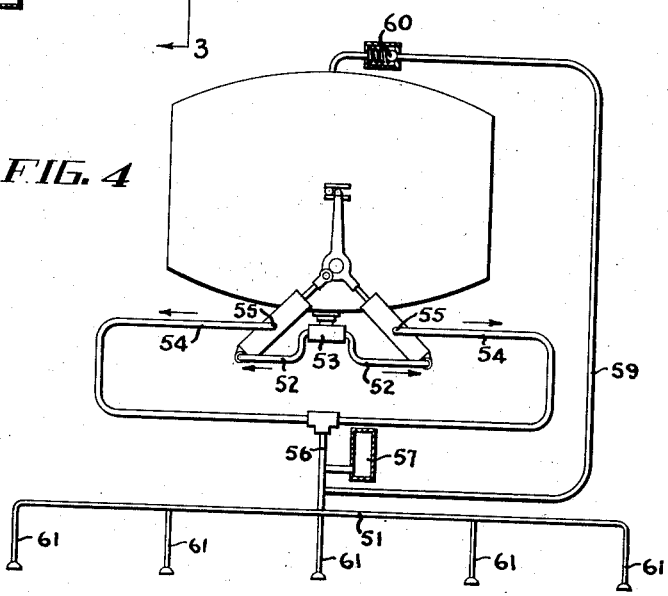
INVENTOR
WARREN M. SPRENG
BY Toulmin & Toulmin
ATTORNEYS Aug. 19, 1941.  W. M. SPRENG  2,252,872
TRACTION SPRAYER
Filed June 19, 1939   3 Sheets-Sheet 3

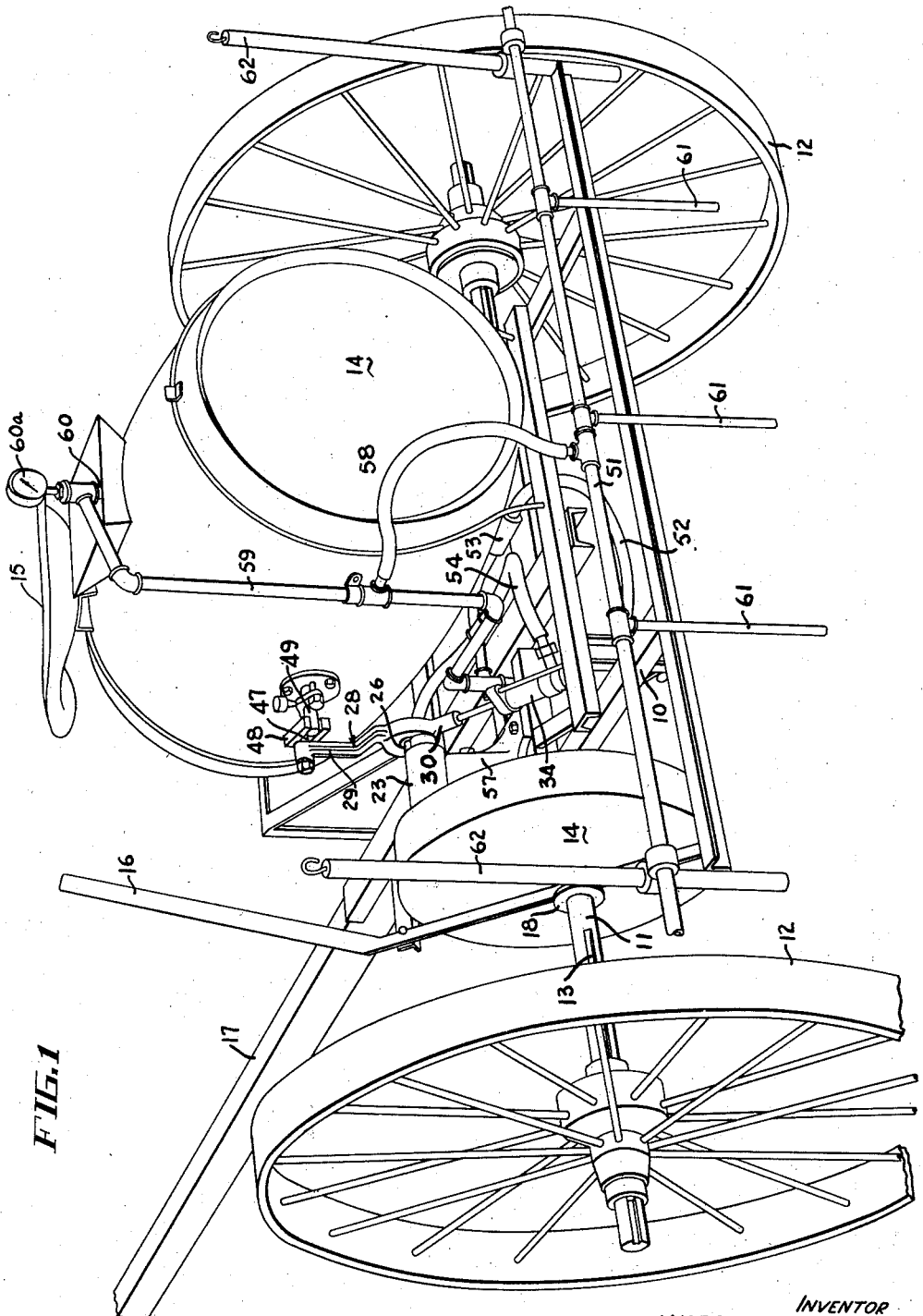

INVENTOR
WARREN M. SPRENG
ATTORNEYS

Patented Aug. 19, 1941

2,252,872

UNITED STATES PATENT OFFICE 2,252,872

TRACTION SPRAYER

Warren M. Spreng, Ashland, Ohio, assignor to The F. E. Myers & Bro. Company, Ashland, Ohio, a corporation of Ohio Application June 19, 1939, Serial No. 279,907

1 Claim. (Cl. 299—42)

My invention relates to traction sprayers and more particularly to spraying devices of the vehicle type which are adapted for spraying one or more rows of plants as the vehicle is moved along over the same.

It will be appreciated, however, that this invention is not limited to the spraying of plants but is adapted for use in applying liquids such as water, oil, tar, paint, etc., to roads, pavements, or the like.

It is an object of this invention to provide a traction sprayer of this character having balanced reciprocating piston pump mechanism for spraying the liquid.

Another object is to provide in a traction sprayer of this character an improved mechanism wherein the liquid spray mixture is maintained positively agitated by means operable simultaneously with the actuation of the spray pumping means.

Another object is to devise a novel combination of traction actuated spray pump and agitator means which provides a balanced, smoothly operating sprayer.

Another object is to provide an improved spray implement of this type having a novel arrangement of pumps and pump actuating crankshaft so as to provide a simple and economical means for spraying liquids.

Another object is to devise a novel pumping mechanism for drawing material to be sprayed from a container or reservoir wherein the suction line from the pump is fitted into the bottom of the container and is adapted to discharge spray solution from the pump into an air chamber which is in communication with suitable spray nozzles.

Another object is to provide an improved traction sprayer comprising clutch control pump actuating gearing means driven by traction wheels wherein the pumps are pivoted at their lower ends to permit oscillation during operation.

Another object is to provide a spraying implement of simplified construction which will function in a reliable and efficient manner and is readily manipulated.

In the drawings, in which is illustrated one exemplification of my invention:

Figure 1 is a perspective view of the traction sprayer of this invention;

Figure 2 is a cross sectional view through the device taken along a line parallel with the axle of the sprayer chassis; the traction wheels being broken away and showing the detail arrangement of the gearing and associated parts;

Figure 4 is a diagrammatic view illustrating the spray conduit system through which the spray material is arranged to be pumped from the reservoir to the spray booms.

Figure 3:
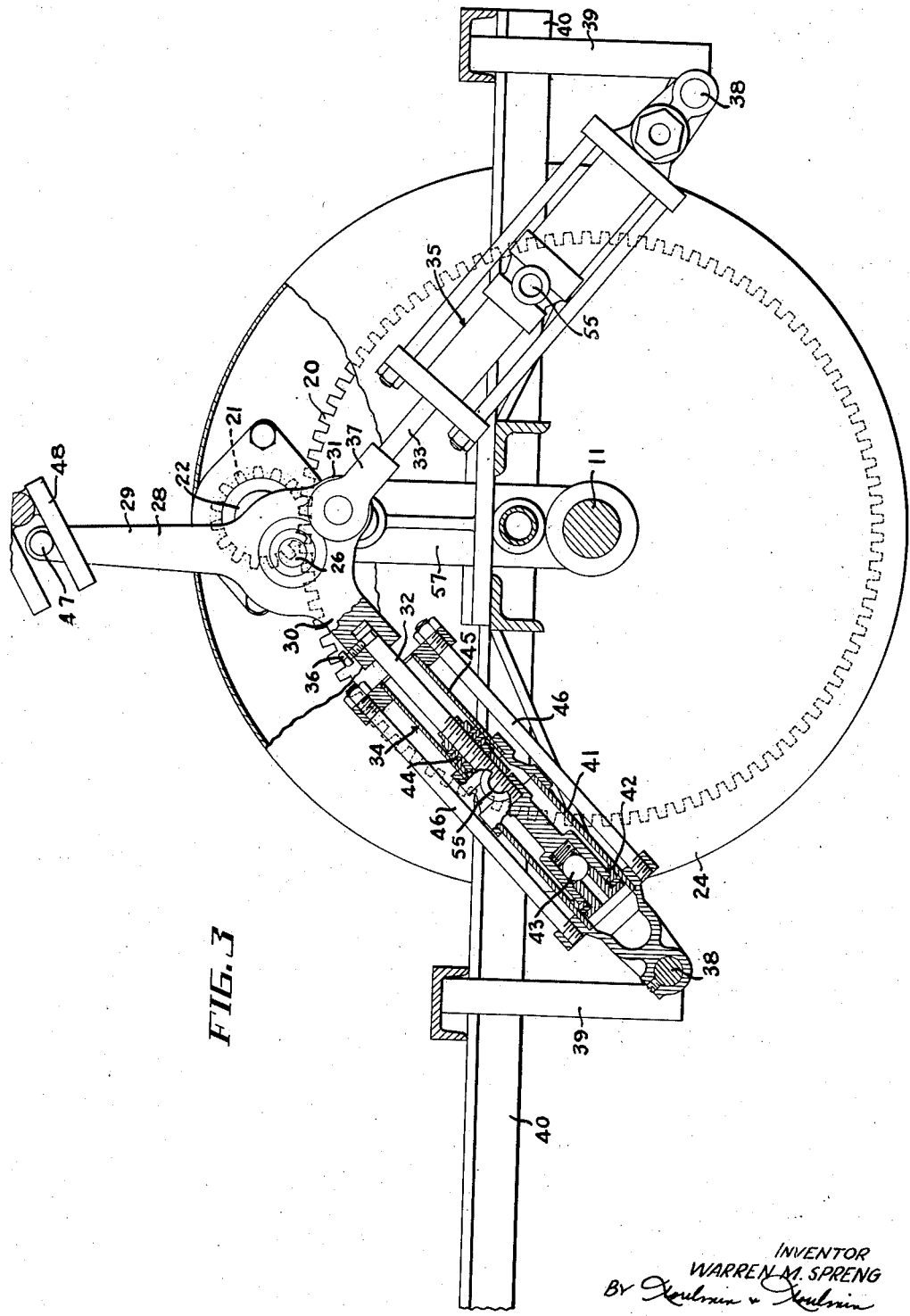
Figure 3 is a sectional view taken substantially on the line 3—3 of Figure 2, looking in the direction of the arrows, and showing one of the pumps in section to illustrate the particular arrangement of the associated parts.

Referring to the drawings in detail, the numeral 10 designates the frame or chassis of the implement, which may be of any suitable construction, mounted on the axle 11 and equipped with traction wheels 12. The wheels are of relatively wide tread so as to provide a large tractive surface. The distance between the wheels can also be adjusted by positioning the same along the elongated keyway 13 of the axle.

Upon the chassis there is suitably secured a barrel or tank 14, or other suitable reservoir for the spray solution. The barrel 14 is preferably mounted horizontally on the chassis so that its axis is at right angles to the axle 11. Preferably fixed on the front end of the barrel or at the forward end of the chassis is a driver seat 15. The seat is conveniently arranged so that the operator can readily manipulate the clutch operating hand lever 16 which controls the pumping mechanism. The chassis 10 is adapted to be equipped with a wagon tongue 17 or any other means suitable for drawing the implement.

The clutch 18 is keyed to the axle 11 and is slidable along the axle shaft by the lever 16 so as to engage or disengage the teeth of the clutch with the gear teeth 19 on the gear 20, which gear is suitably journaled on the axle shaft 11. Engaging the gear 20 is a pinion 21 mounted on the shaft 22 which extends through the bearing member 23. A housing or casing 24 provides a suitable enclosure for the gear and pinion. Crank arm 25 is attached to the pinion shaft 22 at the opposite end from the pinion, and the crank pin 26 integral therewith is adapted to rotate in the bearing 27 of the master connecting rod or link generally designated 28 causing it to oscillate.

As shown in Figure 3 the master connecting rod 28 comprises an upwardly extending arm 29 and downwardly extending angular spaced arm members 30 and 31 which are connected to the piston rods 32 and 33 of the pumps 34 and 35, respectively. The piston rod 32 is rigidly attached to the arm 30 of the master connecting rod member. This may be effected in any desired manner such as by locking the telescoping end portions of the members together by means of set screws 36, as illustrated in Figure 3.

The opposite pump piston rod 33 is connected to the arm 31 through a pivoted link member 37 to permit free action of the pumps during rotation of the master connecting rod 28. Both the pumps 34 and 35 are pivotally mounted at the lower ends on the pins 38 which are suitably anchored to the chassis member 39, which in turn is secured to the frame 40. The pumps comprise a fluid cylinder 41 and a piston 42 which is reciprocated by means of the piston rod. A check valve 43 admits liquid past the piston to the upper part of the cylinder during operation and the packing member 44 forms a fluid seal in the upper narrower piston rod guide portion 45 of the pump. Reinforcement of the pump structure is provided by the bolts 46.

The arm member 29 on the upper end of the master connecting rod 28 is equipped with a crank pin 47 and rotates the yoke 48 and attached shaft 49 which extends into and is suitably journaled in the side walls of the barrel 14 which contains the spray solution. An agitator member 50 is fastened to shaft 49 so as to keep the spray solution thoroughly mixed or agitated during the spraying operation.

Suitable conduits for conveying the spray solution from the container to the spray boom 51 positioned to the rear of the implement are provided for, as illustrated in Figures 1 and 4. A suction line 52 connects with the bottom portion of each pump and communicates with a common suction fitting 53 positioned in the bottom of the barrel or tank and is in communication with the spray solution. Discharge lines 54 are taken off the side of each pump as at 55 and are connected with a common discharge line 56, which in turn is in communication with the bottom of the air chamber 57. The air chamber is integral with the pinion shaft bearing 23, as illustrated in Figure 2.

The common discharge line 56 is connected to the spray boom 51 through the flexible conduit member 58. Bypassing of the liquid to the barrel 14 from the discharge line is permitted by means of the pipe connection 59 which is arranged to discharge liquid into the top of the barrel. On the end of the relief line 59 is fitted an adjustable relief valve 60 and pressure gauge 60a for regulating the fluid pressure at which the material is sprayed. The spray boom 51 comprises a plurality of spray sections 61 having suitable nozzles fitted thereon. The spray boom 51 may be adjusted vertically on the rods 62 attached to the frame at opposite ends of the implement.

During operation of the sprayer, when the implement is drawn along and the clutch engaged, the gear 20 rotates the pinion 21 which actuates the crank 25 and connecting rod 28 operating the pumps 34 and 35 and agitator 50, the crank 25 and master connecting rod 28 operating the pumps 34 and 35 and agitator 50. Spray solution is drawn out from the bottom of the barrel 14 into the pump cylinders and is discharged out the side ports 55 through the common discharge line 56 which is in communication with the air chamber 57, relief valve 60 and spray boom 51 so that as the implement is moved along spray solution is pumped from the barrel or container and discharged out of the nozzles fitted on the spray boom sections. By adjusting the relief valve 60 the discharge pressure of the spray solution can be regulated.

It is, of course, understood that the invention is not limited to the details of construction and that numerous modifications and adaptations may be made without departing from the scope of this invention.

Having thus fully described my invention, what I claim as new and desire to secure by Letters Patent is:

A traction sprayer comprising in combination a chassis frame including an axle and traction wheels thereon, a reservoir for spray fluid mounted on said frame, an agitator for the spray fluid, a shaft pivotally positioned within the reservoir and carrying said agitator, pivotally mounted pumps in communication with said reservoir and arranged angularly in pyramidal form with respect to each other, plunger rods for said pumps, a common connecting rod interconnecting said plunger rods, one of the plunger rods of said pumps being pivotally connected to said connecting rod the other plunger rod being fixedly secured thereto, said connecting rod having an upward extension with a crank pin in the terminus thereof, a yoke drivingly connected with said agitator shaft and receiving said crank pin, and means including a crank arm driven by said tractor wheels for oscillating said connecting rod whereby said agitator is actuated concomitantly with the actuation of the pumps.

WARREN M. SPRENG.